United States Patent
Wang et al.

(10) Patent No.: US 12,218,805 B2
(45) Date of Patent: Feb. 4, 2025

(54) INFORMATION PROCESSING METHOD, METHOD FOR GENERATING AND TRAINING MODULE, ELECTRONIC DEVICE, AND MEDIUM

(71) Applicant: ZTE CORPORATION, Shenzhen (CN)

(72) Inventors: Dajiang Wang, Shenzhen (CN); Youdao Ye, Shenzhen (CN); Xikun Yang, Shenzhen (CN); Weiqing Li, Shenzhen (CN); Zhenyu Wang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 18/253,130

(22) PCT Filed: Sep. 7, 2021

(86) PCT No.: PCT/CN2021/116968
§ 371 (c)(1),
(2) Date: May 16, 2023

(87) PCT Pub. No.: WO2022/105374
PCT Pub. Date: May 27, 2022

(65) Prior Publication Data
US 2024/0015077 A1    Jan. 11, 2024

(30) Foreign Application Priority Data
Nov. 20, 2020    (CN) .................... 202011312980.0

(51) Int. Cl.
*G06F 15/173* (2006.01)
*H04L 41/14* (2022.01)
*H04L 41/147* (2022.01)

(52) U.S. Cl.
CPC .......... *H04L 41/147* (2013.01); *H04L 41/145* (2013.01)

(58) Field of Classification Search
CPC ..... H04L 41/145; H04L 41/147; H04L 41/12; H04L 41/0803; H04L 41/14; H04L 41/142; H04L 41/16; G06N 3/0464; G06N 3/08
See application file for complete search history.

(56) References Cited

U.S. PATENT DOCUMENTS

2007/0253341 A1 * 11/2007 Atkinson ................ H04L 45/02
370/252
2018/0359172 A1 * 12/2018 Yadav ................. H04L 41/5045
(Continued)

FOREIGN PATENT DOCUMENTS

| CN | 109740785 A | 5/2019 |
| CN | 110995520 A | 4/2020 |

(Continued)

OTHER PUBLICATIONS

International Searching Authority. International Search Report and Written Opinion for PCT Application No. PCT/CN2021/116968 and English translation, mailed Dec. 13, 2021, pp. 1-11.
(Continued)

*Primary Examiner* — Dustin Nguyen
*Assistant Examiner* — Hao H Nguyen
(74) *Attorney, Agent, or Firm* — Vivacqua Crane, PLLC (57) ABSTRACT

An information processing method, a method for generating and training a module, an electronic device, and a medium are disclosed. The method for information processing may include acquiring a transmission parameter of service information in a network, where the transmission parameter is indicative of transmission performance of the service information in the network; and predicting transmission perfor-
(Continued)

Create an input node according to the head node information and the end node information — S221

Connect input nodes corresponding to the transmission path information having the same-source relationship or having the same-destination relationship with one another, to acquire the GCN model — S222 mance of the transmission parameter by means of a pretrained network model, where the network model comprises a Graph Convolutional Network (GCN) model that is acquired according to transmission path information of the service information in the network.

17 Claims, 7 Drawing Sheets

(56) References Cited

U.S. PATENT DOCUMENTS

| | | | | |
|---|---|---|---|---|
| 2019/0108445 A1* | 4/2019 | Huang | .................. | G06N 3/048 |
| 2020/0151288 A1* | 5/2020 | Ma | ........................ | G06F 30/327 |
| 2020/0396135 A1* | 12/2020 | Ma | ......................... | H04L 41/16 |
| 2021/0081717 A1* | 3/2021 | Creed | .................... | G06N 5/022 |

FOREIGN PATENT DOCUMENTS

| | | | |
|---|---|---|---|
| CN | 110995520 B | * | 6/2020 |
| CN | 111462088 A | | 7/2020 |
| EP | 1056297 A2 | | 11/2000 |

OTHER PUBLICATIONS

Industrial Property Cooperation Center (IPCC). Search Report for JP Application No. 2023-528716 and English translation, mailed Apr. 24, 2024, pp. 1-31.
Japan Patent Office. Notice of Reasons for Refusal for JP Application No. 2023-528716 and English translation, mailed May 8, 2024, pp. 1-8.
European Patent Office. Extended European Search Report for EP Application No. 21893525.2, mailed Mar. 12, 2024, pp. 1-11.
Zhao, L., et al. "T-GCN: A Temporal Graph Convolutional Network for Traffic Prediction," IEEE Transactions on Intelligent Transportation Systems, vol. 21, No. 9, Sep. 2020, pp. 3848-3858.

* cited by examiner

```
                                                            ┌─ S121
Process a transmission parameter by means of the
  GCN model to acquire a transmission feature
                    parameter
                          │
                          ▼
                                                            ┌─ S122
Process the transmission feature parameter by
means of the DNN model, to acquire a result for
   transmission performance prediction
```

INFORMATION PROCESSING METHOD, METHOD FOR GENERATING AND TRAINING MODULE, ELECTRONIC DEVICE, AND MEDIUM

CROSS-REFERENCE TO RELATED APPLICATION

This application is a national stage filing under 35 U.S.C. § 371 of international application number PCT/CN2021/116968, filed Sep. 7, 2021, which claims priority to Chinese patent application No. 202011312980.0, filed Nov. 20, 2020. The contents of these applications are incorporated herein by reference in their entirety.

TECHNICAL FIELD

The present disclosure relates to but is not limited to the technical field of networks, in particular to a method for information processing, a method for generating a network model, a method for training a network model, an electronic device, and a computer-readable storage medium.

BACKGROUND

With the rapid development of the network, the network topology becomes more and more complex. In order to ensure the stability and high quality of service transmission in the network, it is important to predict the service transmission performance. However, at present, the prediction of service transmission performance in the network mainly relies on the experience of operation and maintenance personnel, which is not smart enough. Although in some cases in this field, the machine learning algorithm is proposed to try to deal with the prediction of service transmission performance, but the factors affecting the prediction of service transmission performance include time, space, social environment and so on. These factors are numerous and complex, which leads to the inefficiency of the simple machine learning algorithm in the prediction of service transmission performance affected by multi-dimensional factors, so that it is not possible to effectively predict the transmission performance of the services in the network.

SUMMARY

The following is a summary of the subject matter described herein. This summary is not intended to limit the scope of protection of the claims.

Provided are a method for information processing, a method for generating a network model, a method for training a network model, an electronic device, and a computer-readable storage medium in some embodiments of the present disclosure, which enable effective prediction for the transmission performance of the service information in a network.

According to an embodiment of the present disclosure, there is provided a method for information processing, which may include, acquiring a transmission parameter of service information in the network, where the transmission parameter is indicative of a transmission performance of the service information in the network; and predicting a transmission performance of the transmission parameter by means of a pre-trained network model, where the network model may include a Graph Convolutional Network (GCN) model that is acquired according to the transmission path information of the service information in the network.

According to another embodiment of the present disclosure, there is provided a method for generating a network model, which may include, acquiring transmission path information of service information in a network; and generating a GCN model according to the transmission path information, where the GCN model may include a plurality of input nodes for inputting a transmission parameter of the service information, the input nodes correspond to the transmission path information, and the transmission parameter is indicative of transmission performance of the service information in the network.

According to yet another embodiment of the present disclosure, there is provided a method for training a network model, which may include, acquiring a transmission parameter of service information in the network, where the transmission parameter is indicative of transmission performance of the service information in the network; and training the network model by the transmission parameter, and where the network model may include a GCN model, and the GCN model is acquired according to the transmission path information of the service information in the network.

According to yet another embodiment of the present disclosure, there is provided an electronic device, which may include a memory, a processor, and a computer program stored in the memory and executable on the processor which, when executed by the processor, causes the processor to carry out the method for information processing as described above.

According to yet another embodiment of the present disclosure, there is provided an electronic device, which may include a memory, a processor, and a computer program stored in the memory and executable on the processor which, when executed by the processor, causes the processor to carry out the method for generating a network model as described above.

According to yet another embodiment of the present disclosure, there is provided an electronic device, which may include a memory, a processor, and a computer program stored in the memory and executable on the processor which, when executed by the processor, causes the processor to carry out the method for training a network model as described above.

According to yet another embodiment of the present disclosure, there is provided a computer-readable storage medium storing a computer-executable instruction which, when executed by a processor causes the processor to carry out any one of the methods as described above.

Other features and advantages of the present application will be illustrated in the following description, and in part will be apparent from the description, or may be understood by practicing the present disclosure. The objects and other advantages of the present disclosure can be achieved and obtained by the structure particularly set forth in the description, claims and drawings.

BRIEF DESCRIPTION OF DRAWINGS

The drawings are intended to provide a further understanding of the technical scheme of the present disclosure, and constitute a part of the specification, and they are intended to illustrate the technical scheme of the present application in conjunction with the embodiments of the present disclosure, but are not intended to limit the technical scheme of the present disclosure.

DETAILED DESCRIPTION

The purpose, technical scheme and advantages of the present disclosure will become apparent through the following description for various embodiments in conjunction with the drawings. It should be understood that the embodiments described here are intended for illustration but not limitation of the present disclosure.

It shall be noted that, in some cases, the steps shown or described may be performed in a different order than the logical order shown in the flowcharts. It should be noted that the terms "first" and "second", if used in the description and the drawings are intended to distinguish similar objects, and does not necessarily imply any specific order or sequence.

Provided are a method for information processing, a method for generating a network model, a method for training a network model, an electronic device, and a computer-readable storage medium in some embodiments of the present disclosure. The method for information processing includes, acquiring a transmission parameter of service information in the network, where the transmission parameter is indicative of a transmission performance of the service information in the network; and predicting a transmission performance of the transmission parameter by means of a pre-trained network model, where the network model includes a GCN model that is acquired according to the transmission path information of the service information in the network. Since the GCN model is obtained according to the transmission path information of service information in the network, the GCN model is consistent with the network topology for transmitting service information. Therefore, the transmission performance of service information in the network can be predicted accurately and effectively by means of processing of the transmission parameters of service information in the network with the network model including the GCN model.

Some embodiments of the present disclosure will be further illustrated with reference to the drawings.

Figure 1:
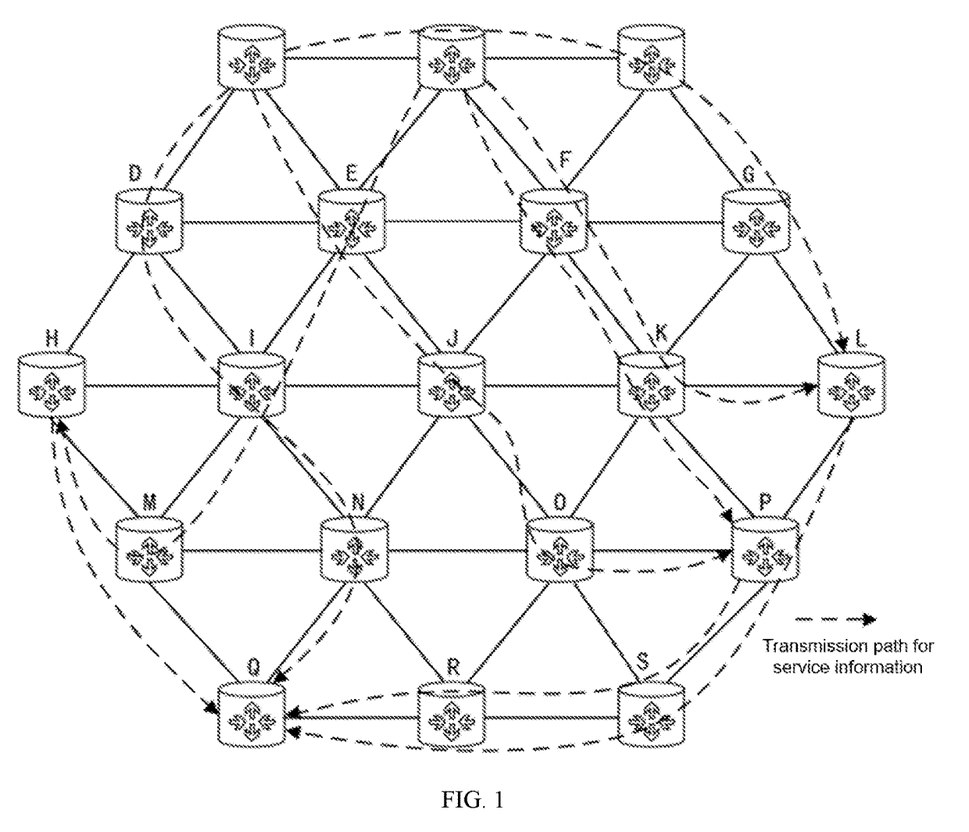
FIG. 1 depicts a schematic diagram showing a network topology in which a method for information processing according to an embodiment of the present disclosure is carried out.

As shown in FIG. 1, which depicts a schematic diagram showing a network topology in which a method for information processing according to an embodiment of the present disclosure is carried out. In the embodiment shown in FIG. 1, the network topology includes a network controller (not shown) and a plurality of nodes (such as node A, node B, . . . and node S in FIG. 1), which are connected by links to form the network topology shown in FIG. 1, and the network controller is connected with each node.

The network controller can obtain information such as node information and service information reported by each node, so that a network topology model can be formed according to the node information. A transmission path of the service information can be planned and configured according to the network topology model. Upon completing the planning and configuration of the transmission path of the service information to obtain a forwarding policy, the network controller then sends the forwarding policy to a corresponding node, so that the node in the network can transmit the service information according to the forwarding policy. For example, the network topology shown in FIG. 1 has the following service transmission paths: the first service transmission path from node A to node L, the second service transmission path from node A to node P, the third service transmission path from node A to node Q, the fourth service transmission path from node B to node P, the fifth service transmission path from node B to node L, the sixth service transmission path from node B to node H, the seventh service transmission path from node L to node Q, the eighth service transmission path from node P to node Q, and the ninth service transmission path from node H to node Q.

In addition, when planning and configuring the transmission path of service information, the network controller can also predict the transmission performance of service information according to the node information and service information uploaded by each node, and can optimize the prediction results accordingly.

In addition, in the distributed network system, each node can obtain the node information advertised by other nodes in the network, so that the network topology information can be obtained according to the node information. For the head node that sends the service information, a corresponding network topology model can be formed according to the network topology information. The transmission path of the service information can be planned and configured according to the transmission performance requirements of the service information to be transmitted. A forwarding policy that meets the requirements can be obtained, and then the service information can be forwarded according to the forwarding policy.

In addition, when the head node sends the service information, plans and configures the transmission path of the service information, the head node can also predict the transmission performance for the service information and optimize the prediction results accordingly.

The network topology and application scenarios described in an embodiment of the present disclosure are illustrative of the technical scheme of some embodiments of the present disclosure, rather than the limitations thereof. Those having ordinary skills in the art will understand that with the evolution of the network topology and the emergence of new application scenarios, the technical scheme proposed herein is also applicable to similar technical problems.

It can be understood by those having ordinary skills in the art that the network topology shown in FIG. 1 does not constitute a limitation to the embodiment of the present disclosure, and may include more or fewer components than those shown, or some components may be combined, or have different component arrangements.

In the network topology shown in FIG. 1, a network controller or a head node sending service information can call the stored information processing program to carry out the method for information processing.

Several embodiments of the present disclosure are proposed based on the above network topology.

Figure 2:
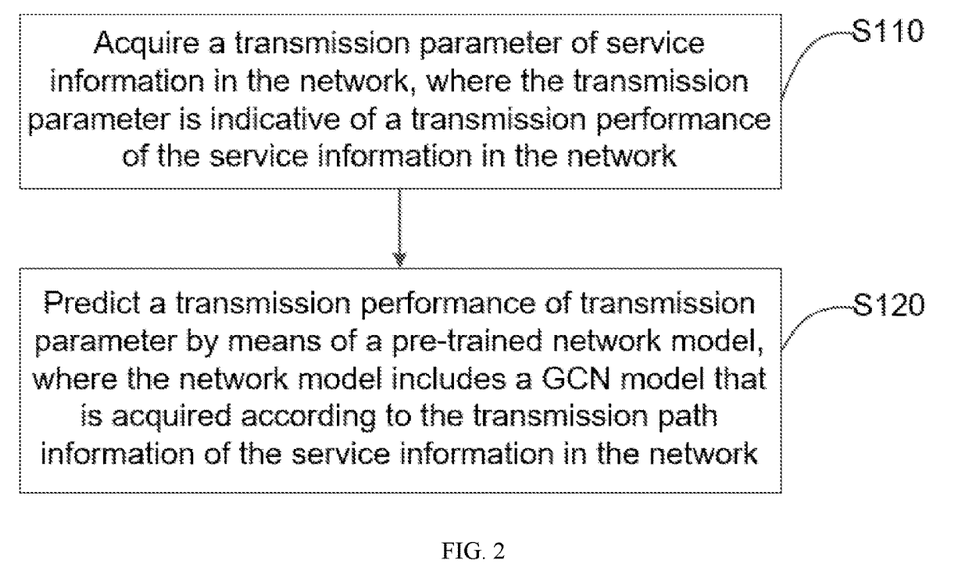
FIG. 2 depicts a flowchart showing a method for information processing according to an embodiment of the present disclosure.

As shown in FIG. 2, which depicts a flowchart showing a method for information processing according to an embodiment of the present disclosure. The method is applied to a network controller, or a head node that sends service information. The method includes but is not limited to operations S110 and S120.

At S110, a transmission parameter of service information in the network is acquired, where the transmission parameter is indicative of the transmission performance of the service information in the network.

In an embodiment, the transmission parameter indicates the transmission performance of the service information in the network, the parameter includes but is not limited to, service flow, Optical Signal Noise Ratio (OSNR), bit error rate, output optical power, etc. It can be understood that the transmission parameter of the service information can be obtained according to the node capability information of the head node, the node capability information of the end node, and the node capability information of the intermediate node passing from the head node to the end node. In addition, the transmission parameter of the service information may be a predicted transmission parameter, or a transmission parameter in real-time detected from the network. And this embodiment does not specifically limit this. For example, when the transmission parameter of service information is obtained by prediction, the prediction model constructed by neural network and other methods can be utilized to predict the node capability information of the head node, the node capability information of the end node and the node capability information of any intermediate node within the passage intervening the head node to the end node, so as to obtain the transmission parameter(s) of service information.

At S120, transmission performance of the transmission parameter is predicted by means of a pre-trained network model, where the network model includes a GCN model that is obtained according to the transmission path information of the service information in the network.

It can be understood that the GCN model is obtained according to the transmission path information of the service information in the network, so the GCN model can be consistent with the network topology for transmitting the service information. Therefore, the transmission parameters of the service information can be processed by means of the pre-trained network model including the GCN model. Thereby, the transmission performance of the service information in the network can be accurately and effectively predicted.

It can be understood that the network model can be pre-trained and stored in the network controller or the head node that sends the service information. Therefore, after obtaining the transmission parameter(s) of the service information in the network, the network model can be utilized to predict the transmission performance of the service information. Since the network model can predict the transmission performance for the transmission parameter(s) of the service information, the training data for training the network model is also the transmission parameter(s) of the service information. It can be understood that there are many implementations for the acquisition of the training data for training the network model, and this embodiment does not specifically limit this. For example, the training data may be obtained by obtaining the transmission parameters of the actually transmitted service information from the network. Alternatively, the training data may be obtained by means of artificial simulation. In case that the training data is obtained by artificial simulation, a virtual network topology can be constructed according to the actual network topology, and then the transmission of service information is simulated in the virtual network topology to obtain the training data.

With the method for information processing including the above S110 and S120, the transmission performance of the transmission parameter of the service information is predicted by the pre-trained network model including the GCN model. Since the GCN model is obtained according to the transmission path information of the service information in the network, the GCN model complies with the network topology for transmitting the service information. Therefore, the transmission performance of the service information in the network can be more accurately and effectively predicted by the network model including the GCN model to process the transmission parameter of the service information in the network.

Figure 3:
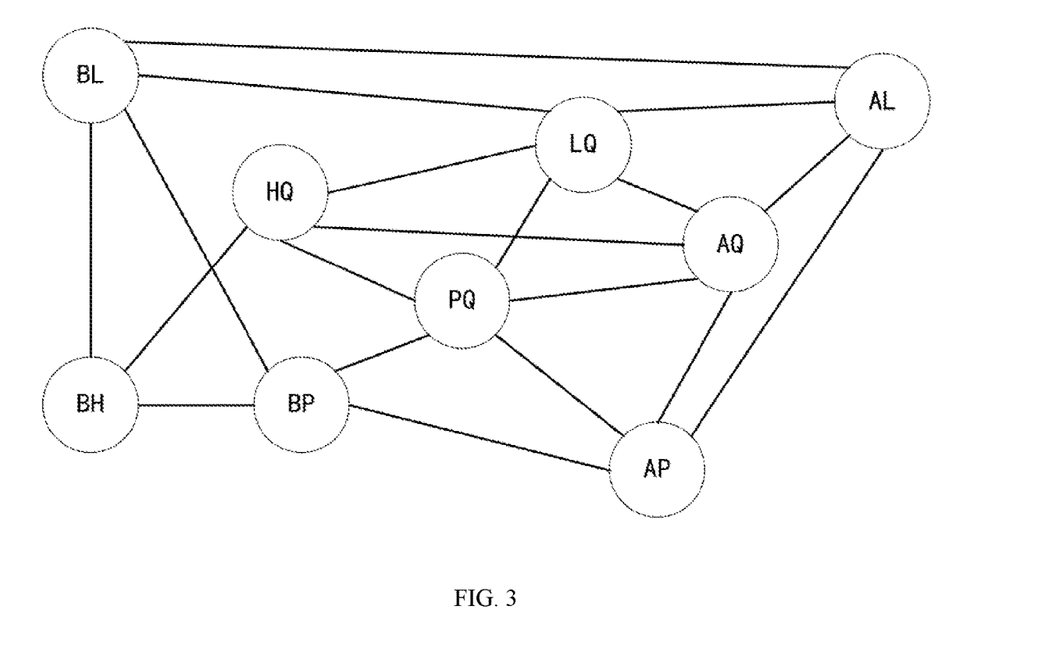
FIG. 3 depicts a schematic diagram showing a GCN model according to an embodiment of the present disclosure.

In an embodiment, since the GCN model is obtained according to the transmission path information of the service information in the network, as shown in FIG. 3, the GCN model may include multiple input nodes for inputting transmission parameter(s). The input nodes correspond to the transmission path information. And the input nodes corresponding to the transmission path information with the same-source relationship or the same-destination relationship are connected with one another.

In the example embodiment of FIG. 3, the GCN model includes input nodes AL, AP, AQ, BP, BL, BH, LQ, PQ, and HQ. Input node AL corresponds to a first service transmission path in the network topology shown in FIG. 1. Input node AP corresponds to a second service transmission path in the network topology shown in FIG. 1. Input node AQ corresponds to the third service transmission path shown in FIG. 1. Input node BP corresponds to the fourth service transmission path in the network topology shown in FIG. 1. Input node BL corresponds to the fifth service transmission path in the network topology shown in FIG. 1. Input node BH corresponds to the sixth service transmission path in the network topology shown in FIG. 1. Input node LQ corresponds to the seventh service transmission path in the network topology shown in FIG. 1. Input node PQ corresponds to the eighth service transmission path in the network topology shown in FIG. 1. And input node HQ corresponds to the ninth service transmission path in the network topology shown in FIG. 1. In particular, the first service transmission path, the second service transmission path and the third service transmission path have an identical source node (i.e., node A), that is, they have a same-source relationship. And thus, input node AL, input node AP and input node AQ are connected with one another. Similarly, input node BP, input node BL and input node BH are connected with one another. Input node AQ, input node LQ, input node PQ and input node HQ are connected with one another. Input node AL, input node BL and input node LQ are connected with one another. Input node AP, input node BP and input node PQ are connected with one another. And input node BH is connected with input node HQ.

It can be understood that the transmission parameter represents the transmission performance of service information in the network, that is, the transmission parameter represents the transmission performance at the time when the service information is transmitted in the corresponding transmission path in the network. Therefore, by means of the GCN model acquired from the transmission path information of service information described above to process the transmission parameters of service information, the transmission performance attributes (i.e., the transmission parameters) based on service information can be transformed into parameters for processing by the GCN model. And the parameters can be input to each input node. And thus, it is possible for the network models including the GCN model to predict the transmission performance of service information in the network.

Figure 4:
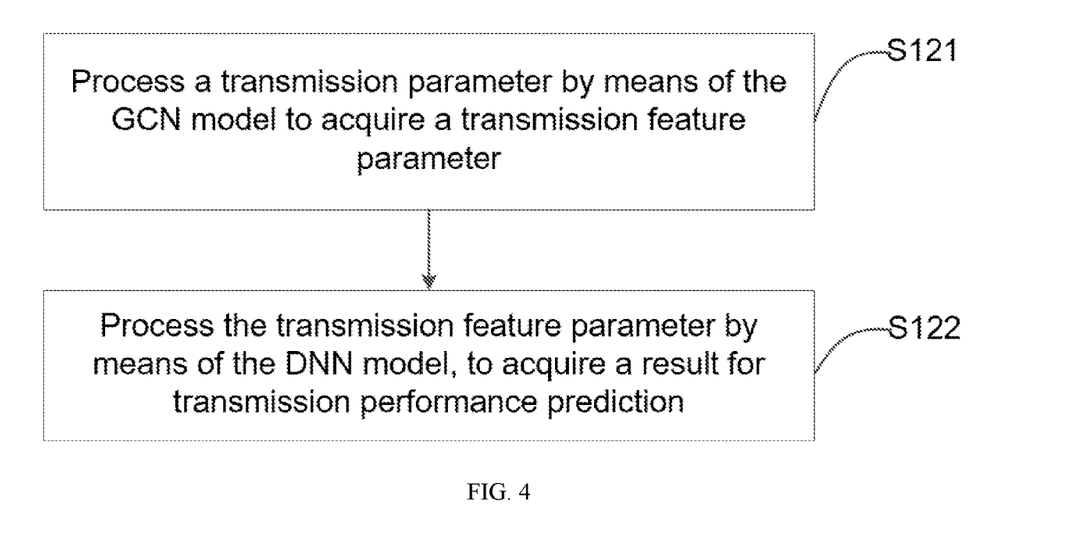
FIG. 4 depicts a flowchart showing the transmission performance prediction in a method for information processing according to another embodiment of the present disclosure.

In addition, in an embodiment, the network model may also include a Deep Neural Network (DNN) model. The input of the DNN model is connected with the output of the GCN model. In this case, as shown in FIG. 4, the prediction of transmission performance of transmission parameters by means of the pre-trained network model at S120 may include but is not limited to the following operations.

At S121, a transmission parameter is processed by means of the GCN model to obtain a transmission feature parameter.

At S122, the transmission feature parameter is processed by means of the DNN model, to acquire a result for transmission performance prediction.

In an embodiment, the transmission parameters of service information can be obtained at different moments. Then these transmission parameters are extracted by the GCN model according to time dimension and spatial dimension to obtain transmission feature parameters. Then, these transmission feature parameters are transmitted to the DNN model as inputs of the DNN model, so that the DNN model can process these transmission feature parameters to obtain the results of transmission performance predictions for service information at the future moments.

Figure 5:
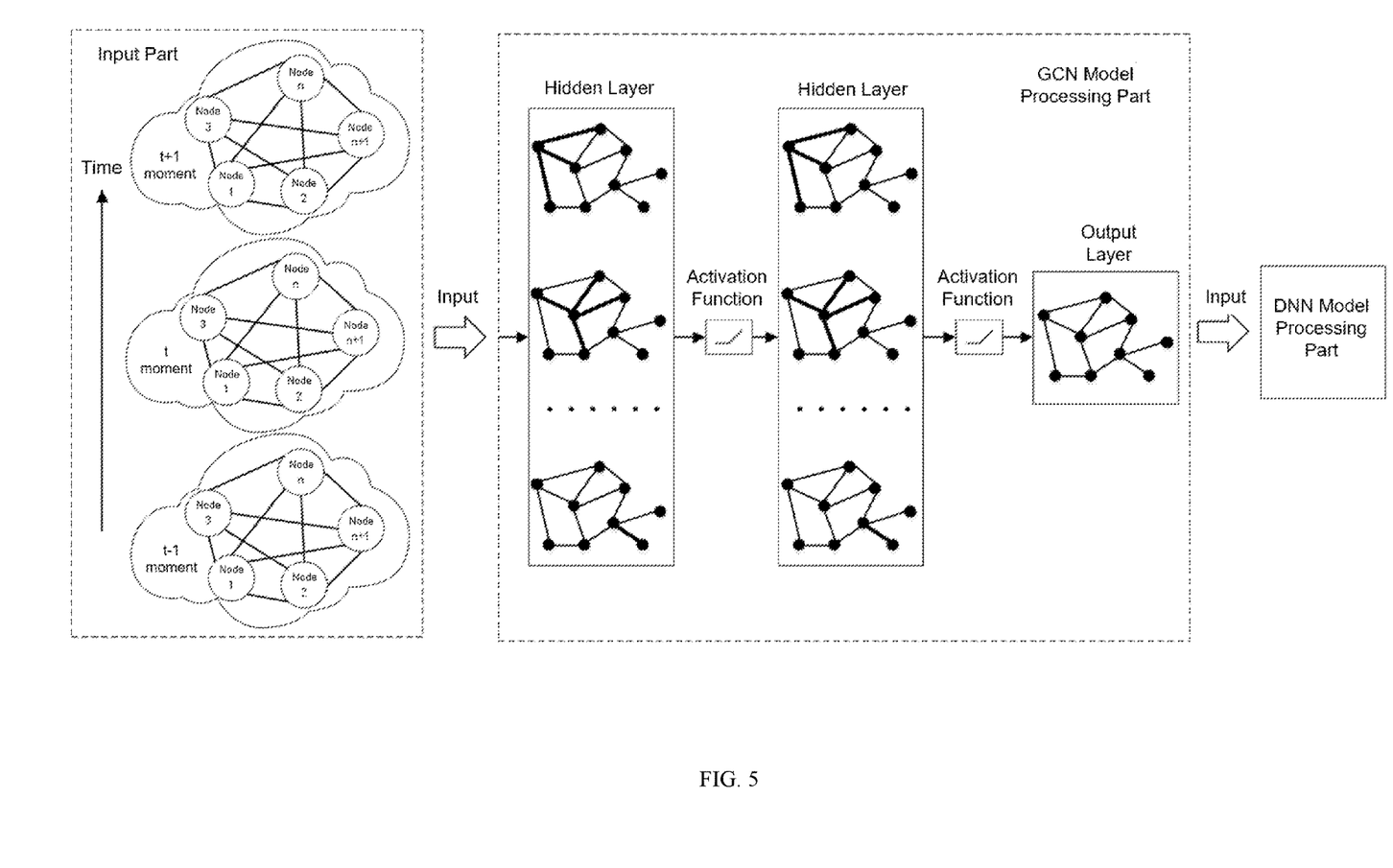
FIG. 5 depicts a schematic diagram showing a prediction model system for predicting transmission performance of transmission parameters according to an embodiment of the present disclosure.

The prediction model system shown in FIG. 5 is illustrated by way of an example. First, the transmission parameter of service information is obtained at each moment respectively. For example, the transmission parameters of service information corresponding to n input nodes are acquired at moment t and moment t+1 (i.e., the input parameters of n input nodes in the input part shown in FIG. 5). Then, these input parameters are input into the GCN model processing part shown in FIG. 5, such that the GCN model can process these input parameters to obtain the transmission feature parameters corresponding to the subsequent moment. Then, the transmission feature parameters are input into the DNN model processing part as shown in FIG. 5, so that the DNN model can process the transmission feature parameters and obtain the result of transmission performance prediction of the service information at the subsequent moment. Therefore, the result of the transmission performance prediction can be taken as the directing information for optimization processing to optimize the transmission performance of the service information, so as to improve the transmission performance of the service information.

It is worth noting that the feature extraction of the transmission parameters according to the time dimension with the GCN model refers to the feature extractions of the transmission parameters with the GCN model at different moments. And the feature extraction of the transmission parameters according to the spatial dimension with the GCN model refers to the feature extractions of the transmission parameters with the convolution processing to obtain the feature parameters with spatial features.

In an embodiment, the GCN model can be expressed by an equation $y=\Theta*gx=\sigma(\alpha(L)x)$. In particular, Y is the transmission feature parameter, i.e., the output parameter after the transmission parameter is subjected to the prediction processing by the GCN mode. x is the transmission parameter, i.e., x is the input parameter input to the GCN model. $\Theta$ is the convolution kernel function. $*g$ is a graphic convolution operator with a spectral method, which denotes the product of x and $\Theta$. $\alpha$ is the convolution kernel parameter. L is the normalized graphic Laplacian operator. And $\sigma$ is the activation function, such as the ReLU activation function.

It can be understood that, when the transmission parameters of the service information in the network are obtained and input into the equation $y=\Theta*gx=\sigma(\alpha(L)x)$, as the input parameters of the GCN model, then we can get:

$$y = \Theta * gx = \sigma\left(\sum_{j=1}^{k}\sum_{t=1}^{M}\alpha_{jt}(L)_{x_{jt}}\right).$$

In particular, $y \in R^n$ denotes the transmission feature parameters with time and spatial feature obtained by graph convolution of transmission parameters via the GCN model. n denotes the number of transmissions of the service information in the network (i.e., the number of transmission paths for transmitting the service information). $x \in R^{M \times n \times k}$ denotes the n transmission parameters at M moments input to the GCN model, and each transmission parameter is a k-dimensional transmission performance attribute. $\alpha_{jt} \in R^n$ denotes the convolution kernel parameter of the j th dimension transmission performance attribute of the n transmission parameters at the t th moment. $x_{jt} \in R^n$ denotes the j th dimension transmission performance attribute of n transmission parameters at the t th moment input to the GCN model.

In addition, in an embodiment, after S122 is performed, the method for information processing may further include, but is not limited to, the following operation.

The transmission performance of service information is optimized by means of the results of the transmission performance prediction.

It can be understood that the GCN model is obtained according to the transmission path information of the service information in the network, so the GCN model is consistent with the network topology for transmitting the service information. Therefore, the result of the transmission performance prediction is obtained by means of the network model including the GCN model to predict transmission performance of the transmission parameters of service information in the network. Thereby, the result of the transmission performance prediction can be taken as the guiding information for optimization processing to optimize the transmission performance of service information, so as to improve the transmission performance of service information. There are various implementations for optimizing the transmission performance of the service information by means of the result of the transmission performance prediction, this embodiment does not specifically limit this. For example, the performance parameters of the service information in the corresponding transmission path can be adjusted according to the result of the transmission performance prediction to achieve the optimization of the transmission performance. Alternatively, the transmission path of the service information in the network can also be changed according to the result of the transmission performance prediction to achieve the optimization of the transmission performance.

Figure 6:
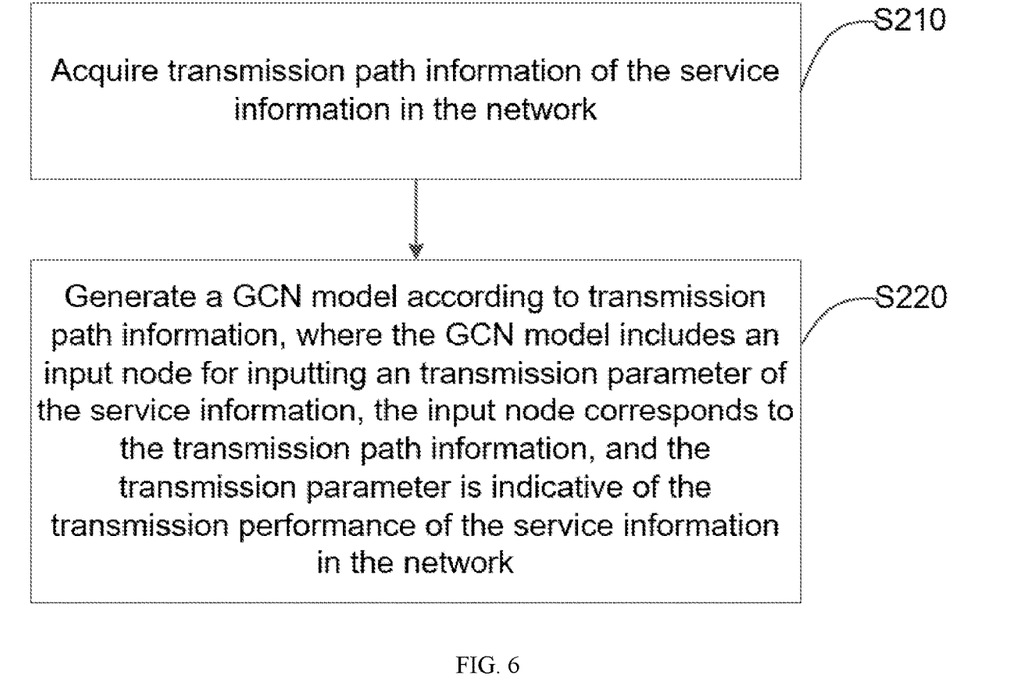
FIG. 6 depicts a flow chart showing a method for generating a network model according to an embodiment of the present disclosure.

FIG. 6 depicts a flowchart showing a method for generating a network model according to another embodiment of the present disclosure. The method is applied to a network controller or a head node sending service information, and includes but is not limited to the following operations.

At S210, transmission path information of the service information in the network is acquired.

At S220, a GCN model is generated according to transmission path information, where the GCN model includes an input node for inputting a transmission parameter of the service information, the input node corresponds to the transmission path information, and the transmission parameter is indicative of the transmission performance of the service information in the network.

It can be understood that the GCN model generated according to the transmission path information in this embodiment is the GCN model for predicting the transmission performance of the transmission parameters of the service information in the network in the embodiment shown in FIG. 2.

It can be understood that the transmission path information of service information in the network may include head node information and end node information. The head node information includes the address information of the head node that sent the service information, and the end node information includes the address information of the end node that receives the service information. When the head node is ready to send the service information to the end node, the address information of the head node and the address information of the end node can be obtained from the head node, so that the transmission path information of the service information can be determined.

In an embodiment, the transmission parameter indicates the transmission performance of the service information in the network, the parameter includes but is not limited to, service flow, OSNR, bit error rate, output optical power, etc. It can be understood that the transmission parameter of the service information can be obtained according to the node capability information of the head node, the node capability information of the end node, and the node capability information of the intermediate node passing from the head node to the end node. In addition, the transmission parameter of the service information may be a predicted transmission parameter, or a transmission parameter in real-time detected from the network. And this embodiment does not specifically limit this. For example, when the transmission parameter of service information is obtained by prediction, the prediction model constructed by neural network and other methods can be utilized to predict the node capability information of the head node, the node capability information of the end node and the node capability information of any intermediate node within the passage intervening the head node to the end node, so as to obtain the transmission parameter(s) of service information.

After obtaining the transmission path information of the service information in the network, the GCN model including the input node for inputting the transmission parameters of the service information can be generated according to the transmission path information. The input node of the GCN model corresponds to the transmission path information. For example, the input node AL shown in FIG. 3 corresponds to the first service transmission path shown in FIG. 1. Transmission parameters represent the transmission performance of service information in the network, and GCN model is obtained according to the transmission path information of service information in the network. And thus, the transmission parameters are taken as input parameters of input nodes of the GCN model, such that, the accurate and effective prediction of the transmission performance of service information in the network can be achieved.

Figure 7:
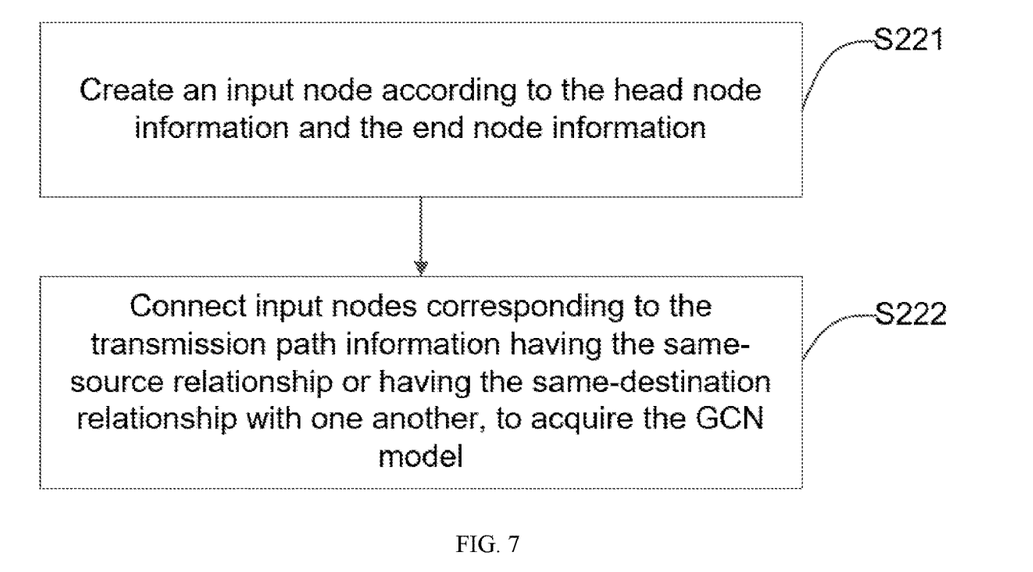
FIG. 7 depicts a flowchart showing the generation of a GCN model in a method for generating a network model according to another embodiment of the present disclosure.

In an embodiment, as shown in FIG. 7, the generation of the GCN model according to the transmission path information at S220 may include, but is not limited to, the following operations.

At S221, an input node is created according to the head node information and the end node information.

At S222, input nodes corresponding to the transmission path information with the same-source relationship or the same-destination relationship are connected with one another, to acquire the GCN model.

It can be understood that by establishing the input nodes of the GCN model according to the information of the head node and the end node for transmitting service information, and connecting all input nodes corresponding to the transmission path information with the same-source relationship or the same-destination relationship, the GCN model thus obtained can predict the transmission parameters of the service information in the corresponding transmission path, and can accurately and effectively predict the transmission performance of the service information in the network.

The generation of the GCN model will be further illustrated by way of an example.

Figure 8:
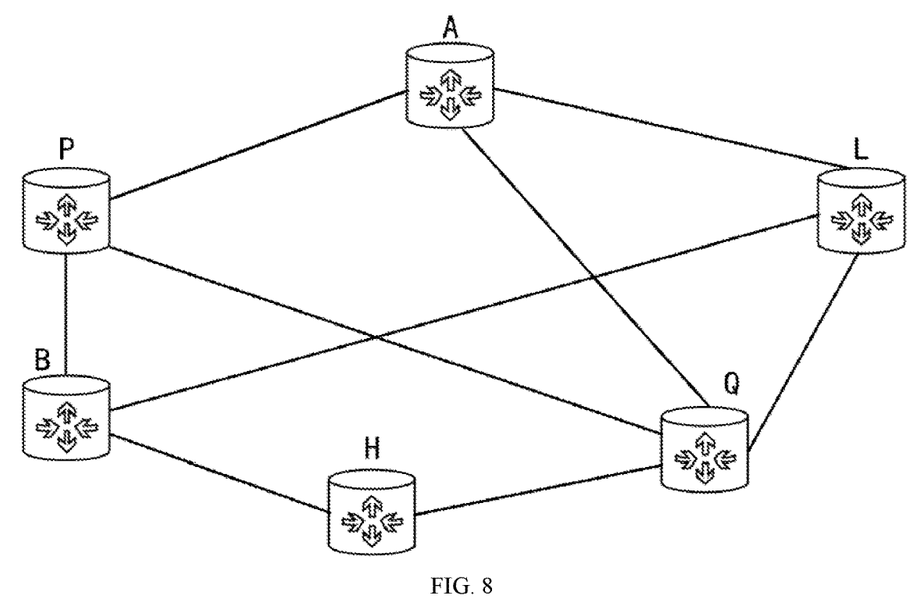
FIG. 8 depicts a schematic diagram showing a virtual topology of a service network according to an embodiment of the disclosure.
Figure 9:
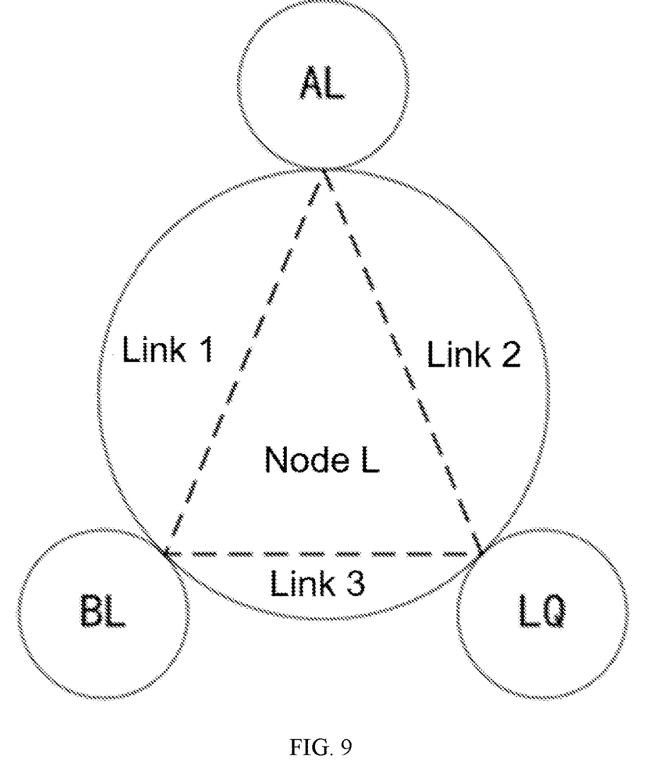
FIG. 9 depicts a schematic diagram showing a node chaining processing according to an embodiment of the present disclosure.

The network topology as shown in FIG. 1, when there is only a single link between adjacent nodes, according to the head node and the end node of each service path and the intermediate nodes are omitted, the network topology is simplified into a virtual topology of the service network as shown in FIG. 8. The virtual topology of the service network only includes the head node and the end node of each service path, and for each service path, the head node and the end node are directly connected to form a service virtual link. After the network topology as shown in FIG. 1 is abstracted into the virtual topology of service network as shown in FIG. 8, according to the number of out-degree of each node in the virtual topology of service network as shown in FIG. 8 and the pairwise dependency relationship (such as the same-source relationship or the same-destination relationship) that the service virtual links share the same end node, each node can be abstracted and transformed into $C_z^2$ virtual paths, in which z denotes the number of out-degree of the node. Take node L in FIG. 8 as an example. The service virtual link AL, the service virtual link BL, and the service virtual link LQ share node L as the end node. Therefore, referring to the schematic diagram of node chaining processing shown in FIG. 9, node L can be abstractly converted into three virtual paths. In addition, after abstracting the network topology as shown in FIG. 1 into virtual topology of service network as shown in FIG. 8, each service virtual link in the virtual topology of service network is abstractly converted into an input node of the GCN model. That is, the input node is established according to the head node information and the end node information. For example, the service virtual link from node A to node L is abstractly converted into an input node AL. After all the service virtual links in the virtual topology of service network shown in FIG. 8 are abstracted and converted into the input nodes, according to the chaining processing shown in FIG. 9, the input nodes corresponding to the service virtual links with the same-source relationship or the same-destination relationship are connected, and the GCN model in which one service path is represented by one virtual node (i.e., an input node) as shown in FIG. 3 can be obtained. Since the GCN model is obtained according to the transmission path information of service information in the network, the GCN model is consistent with the network topology for transmitting service information. Therefore, the transmission performance of service information in the network can be predicted accurately and effectively by means of the prediction of the transmission parameters of service information in the network with the GCN model.

Figure 10:
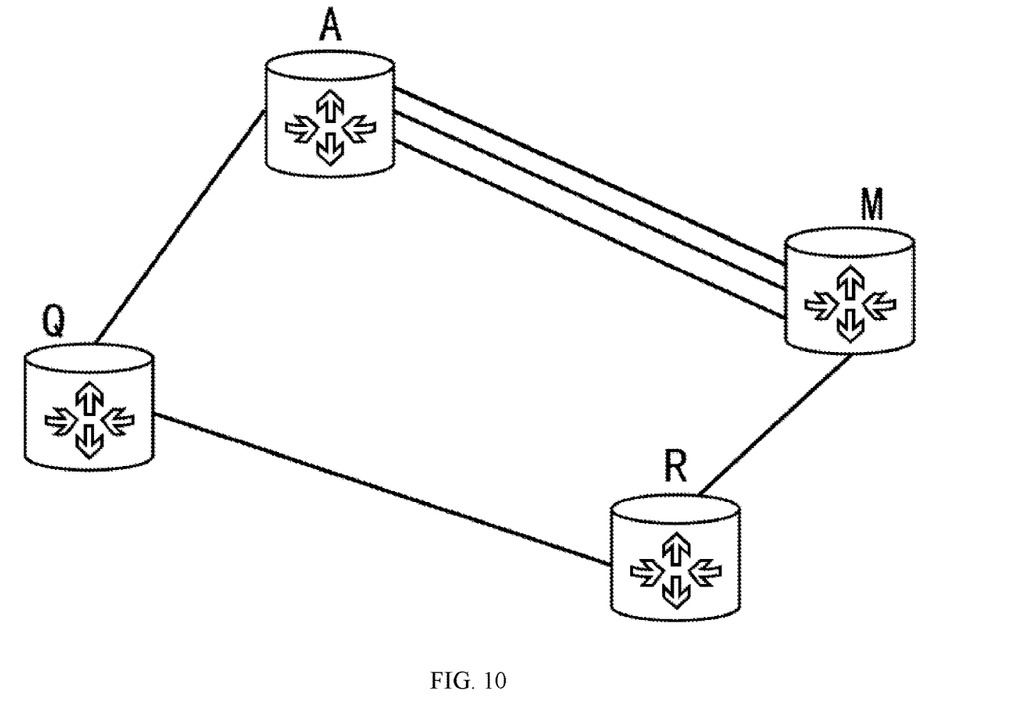
FIG. 10 depicts a schematic diagram showing a network topology according to an embodiment of the present disclosure.
Figure 11:
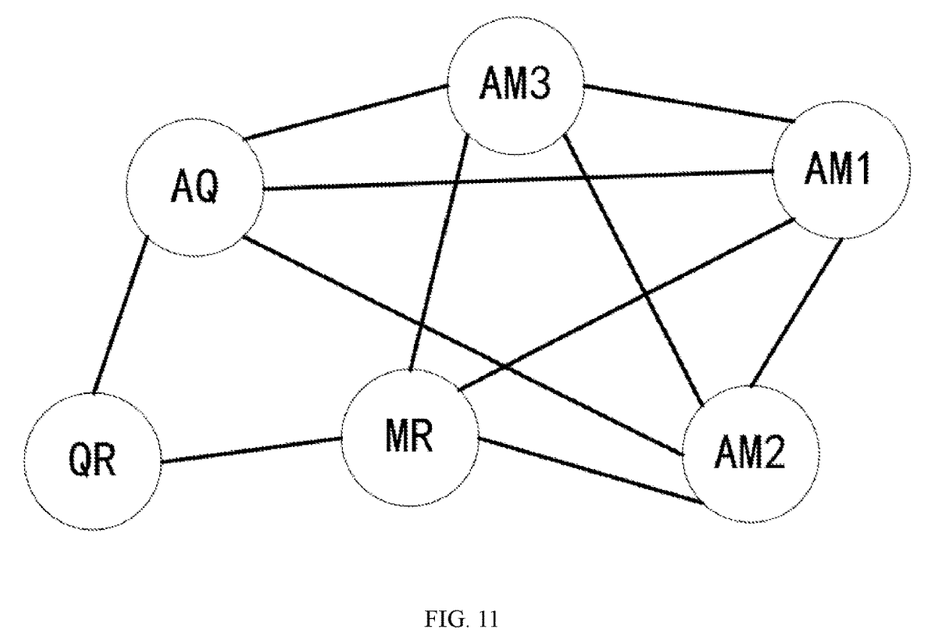
FIG. 11 depicts a schematic diagram showing a GCN model constructed according to the network topology of FIG. 10 according to another embodiment of the present disclosure.

It is worth noting that in case that multiple links are present between adjacent nodes, the network topology of multiple links between adjacent nodes can be transformed into the network topology of single link between adjacent nodes by appending virtual nodes, and then the GCN model can be constructed in the manner as described above. For example, if there are three service virtual links between node A and node M in the network topology as shown in FIG. 10, these three service virtual links can be abstractly converted into input node AM1, input node AM2 and input node AM3 by appending the virtual nodes. Meanwhile, the service virtual link from node A to node Q is abstracted and converted into input node AQ. The service virtual link from node Q to node R is abstracted and converted into input node QR. And the service virtual link from node M to node R is abstracted and converted into input node MR. In this way, the GCN model as shown in FIG. 11 is created.

In addition, it is worth noting that if the service path needs an intermediate node to pass through as an electrical relay, the entire service path can be divided into multiple service path segments according to the head node, the end node and the electrical relay node. Each service path segment is regarded as an independent service path for virtualization processing.

In an embodiment, the GCN model generated according to the transmission path information of the service information in the network can be expressed by an equation $y=\Theta*gx=\sigma(\alpha(L)x)$, where Y is the output parameter of the GCN model; x is the input parameter to the GCN model; $\Theta$ is the convolution kernel function; $*g$ is the graph convolution operator with spectral method, which denotes the product of x and $\Theta$; $\alpha$ is the convolution kernel parameter; L is the normalized graph Laplacian operator; $\sigma$ is the activation function, such as the ReLU activation function.

It can be understood that, when the transmission parameters of the service information in the network are obtained and input into the equation $y=\Theta*gx=\sigma(\alpha(L)x)$, as the input parameters of the GCN model, then we can get:

$$y = \Theta*gx = \sigma\left(\sum_{j=1}^{k}\sum_{t=1}^{M}\alpha_{jt}(L)x_{jt}\right).$$

In particular, $y \in R^n$ denotes the transmission feature parameters with time and spatial feature obtained by graph convolution of transmission parameters via the GCN model. n denotes the number of transmissions of the service information in the network (i.e., the number of transmission paths for transmitting the service information). $x \in R^{M \times n \times k}$ denotes the 11 transmission parameters at M moments input to the GCN model, and each transmission parameter is a k-dimensional transmission performance attribute. $\alpha_{jt} \in R^n$ denotes the convolution kernel parameter of the j th dimension transmission performance attribute of the n transmission parameters at the t th moment. $x_{jt} \in R^n$ denotes the j th dimension transmission performance attribute of n transmission parameters at the t th moment input to the GCN model.

Figure 12:
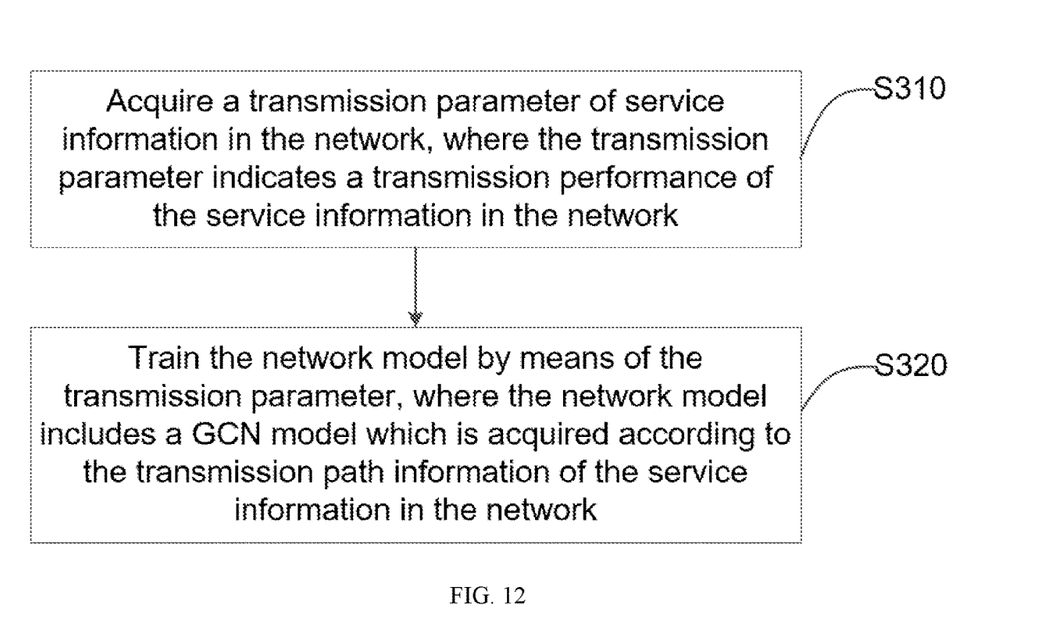
FIG. 12 depicts a flowchart showing a method for training a network model according to an embodiment of the present disclosure.

FIG. 12 depicts a flowchart showing a method for training a network model according to another embodiment of the present disclosure. The method is applied to a network controller, or a head node that sends service information, and includes but is not limited to the following operations.

At S310, a transmission parameter of service information in the network is acquired, where the transmission parameter indicates a transmission performance of the service information in the network.

At S320, the network model is trained by means of the transmission parameter, where the network model includes a GCN model which is acquired according to the transmission path information of the service information in the network.

It can be understood that the GCN model trained by means of the transmission parameters of the service information in the network in this embodiment is the pre-trained GCN model in the embodiment shown in FIG. 2 and the GCN model generated according to the transmission path information in the embodiment shown in FIG. 6. The GCN model is obtained by means of the method for generating in the embodiment shown in FIG. 6. Then the GCN model is trained by means of the method for training in this embodiment. After the training is completed, the pre-trained GCN model in the embodiment shown in FIG. 2 can be obtained.

It can be understood that the transmission path information of service information in the network may include head node information and end node information. The head node information includes the address information of the head node that sent the service information, and the end node information includes the address information of the end node that receives the service information. When the head node is ready to send the service information to the end node, the address information of the head node and the address information of the end node can be obtained from the head node, so that the transmission path information of the service information can be determined.

In an embodiment, the transmission parameter indicates the transmission performance of the service information in the network, the parameter includes but is not limited to, service flow, OSNR, bit error rate, output optical power, etc. It can be understood that the transmission parameter of the service information can be obtained according to the node capability information of the head node, the node capability information of the end node, and the node capability information of the intermediate node passing from the head node to the end node. In addition, the transmission parameter of the service information may be a predicted transmission parameter, or a transmission parameter real-time detected from the network. And this embodiment does not specifically limit this. For example, when the transmission parameter of service information is obtained by prediction, the prediction model constructed by neural network and other methods can be utilized to predict the node capability information of the head node, the node capability information of the end node and the node capability information of any intermediate node within the passage intervening the head node to the end node, so as to obtain the transmission parameter(s) of service information.

Since the network model that includes the GCN model can predict the transmission performance for the transmission parameter(s) of the service information, the training data for training the network model is also the transmission parameter(s) of the service information. It can be understood that there are many implementations for the acquisition of the training data for training the network model, and this embodiment does not specifically limit this. For example, the training data may be obtained by obtaining the transmission parameters of the actually transmitted service information from the network. Alternatively, the training data may be obtained by means of artificial simulation. In case that the training data is obtained by artificial simulation, a virtual network topology can be constructed according to the actual network topology, and then the transmission of service information is simulated in the virtual network topology to obtain the training data.

By means of the method for training includes the above S310 and S320, the network model including the GCN model is trained by means of the transmission parameters of the service information in the network. Since the GCN model is obtained according to the transmission path information of the service information in the network, the GCN model is consistent with the network topology for transmitting the service information. And since the transmission parameters represent the transmission performance of service information while it is being transmitted in the corresponding transmission path in the network, the network model including the GCN model can be trained by means of the transmission parameters of service information, so that the trained network model including the GCN model can accurately and effectively predict the transmission performance of the service information in the network.

In an embodiment, the GCN model may include an input node for inputting transmission parameter(s). The input node corresponds to the transmission path information. And the input nodes corresponding to the transmission path information with the same-source relationship or the same-destination relationship are connected.

It should be noted that since the GCN model in this embodiment is the GCN model in the embodiment shown in FIG. 2, for the specific structure of the GCN model in this embodiment, please refer to the description in the embodiment shown in FIG. 3, which will not be repeated here.

Figure 13:
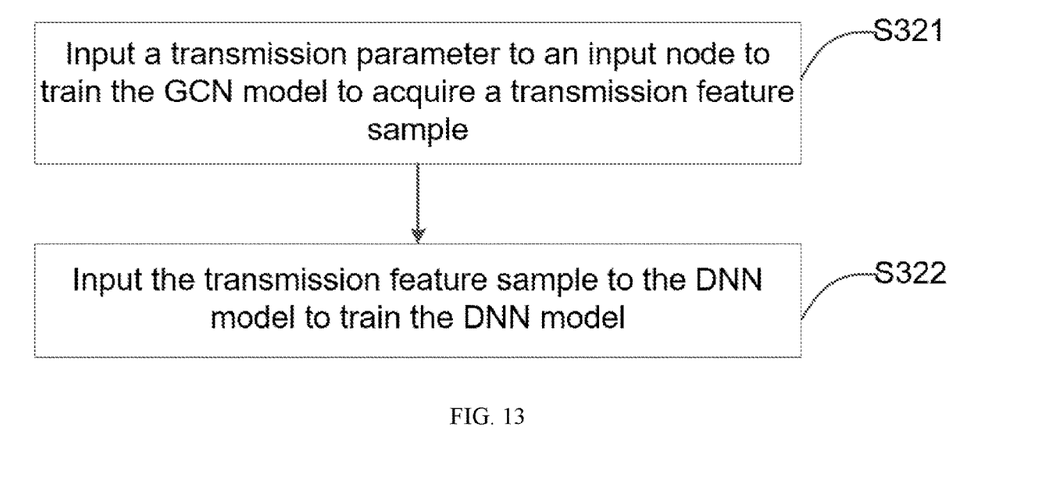
FIG. 13 depicts a flowchart showing the training of a network model in a method for training a network model according to another embodiment of the present disclosure.

In an embodiment, the network model may also include a DNN model. The input of the DNN model is connected with the output of the GCN model. In this case, as shown in FIG. 13, the training of the network model by means of the transmission parameters at S320 may include, but is not limited to, the following operations.

At S321, a transmission parameter is input to an input node to train the GCN model to acquire a transmission feature sample.

At S322, the transmission feature sample is input to the DNN model to train the DNN model.

In an embodiment, the transmission parameters of service information can be obtained at different moments. Then these transmission parameters are input to the input node to train the GCN model, so that the GCN model can extract the features of these transmission parameters according to the time dimension and the spatial dimension to obtain transmission feature samples. Then these transmission feature samples are input to the DNN model to train the DNN model, so that the trained GCN model and DNN model can accurately and effectively predict the transmission performance of service information in the network.

The process of training the network model by means of the transmission parameters are illustrated by way of an example. As shown in FIG. 5, first, the transmission parameters of service information are obtained at different moments as initial training sample data. For example, the transmission parameters of service information corresponding to n input nodes are obtained at moment t and moment t+1 as training sample data. Then these training sample data are input into the GCN model processing part as shown in FIG. 5, such that the GCN model can be trained by these training sample data to obtain transmission feature samples. Then these transmission feature samples are input into the DNN model processing part as shown in FIG. 5, so that the DNN model can be trained by the transmission feature samples. In this way, the trained network model including the GCN model can accurately and effectively predict the transmission performance of the service information in the network.

It is worth noting that the feature extraction of the transmission parameters according to the time dimension with the GCN model refers to the feature extractions of the transmission parameters with the GCN model at different moments. And the feature extraction of the transmission parameters according to the spatial dimension with the GCN model refers to the feature extractions of the transmission parameters with the convolution processing to obtain the feature parameters with spatial features.

In an embodiment, the input of the transmission parameter to the input node to train the GCN model at S321 may include, but is not limited to, the following operation.

The transmission parameter is input to the input node, and the GCN model is trained by a back propagation algorithm.

It can be understood that, the training of the GCN model with back propagation algorithm can realize the training of GCN model in the form of supervised learning, such that the trained GCN model can predict the transmission performance of transmission parameters of service information in the network with an improved accuracy. In this way, the prediction of the transmission performance of service information in the network can be done with the subsequent information processing operations in a more accurate and effective manner.

In addition, in an embodiment, S322 may include, but is not limited to, the following operation.

The transmission feature sample is input into a DNN model which is then trained by a back propagation algorithm.

It can be understood that, the training of the DNN model with back propagation algorithm can realize the training of DNN model in the form of supervised learning, such that the trained DNN model can predict the transmission performance of transmission parameters of service information in the network with an improved accuracy. In this way, the prediction of the transmission performance of service information in the network can be done with the subsequent information processing operations in a more accurate and effective manner.

In an embodiment, the GCN model generated according to the transmission path information of the service information in the network can be expressed by an equation $y=\Theta*gx=\sigma(\alpha(L)x)$, where Y is the output parameter of the GCN model; x is the input parameter to the GCN model; $\Theta$ is the convolution kernel function; $*g$ is the graph convolution operator with spectral method, which denotes the product of x and $\Theta$; $\alpha$ is the convolution kernel parameter;

L is the normalized graph Laplacian operator; σ is the activation function, such as ReLU activation function.

It can be understood that, when the transmission parameters of the service information in the network are obtained, the transmission parameters can be input into the equation y=Θ*gx=σ(α(L)x), as the training sample data, so as to train the GCN model. It should be noted that when the transmission parameters are input into the equation y=Θ*gx=σ(α(L)x) as training sample data, we can obtain:

$$y = \Theta * gx = \sigma\left(\sum_{j=1}^{k}\sum_{t=1}^{M}\alpha_{jt}(L)x_{jt}\right).$$

In particular, $y \in R^n$ denotes the transmission feature parameters with time and spatial feature obtained by graph convolution of transmission parameters via the GCN model. n denotes the number of transmissions of the service information in the network (i.e., the number of transmission paths for transmitting the service information). $x \in R^{M \times n \times k}$ denotes the n transmission parameters at M moments input to the GCN model, and each transmission parameter is a k-dimensional transmission performance attribute. $\alpha_{jt} \in R^n$ denotes the convolution kernel parameter of the j th dimension transmission performance attribute of the n transmission parameters at the t th moment. $x_{jt} \in R^n$ denotes the j th dimension transmission performance attribute of n transmission parameters at the t th moment input to the GCN model.

In addition, an embodiment of the present disclosure further provides an electronic device, which includes a memory, a processor and a computer program stored in the memory and executable by the processor.

The processor and the memory may be connected by a bus or other means.

As a non-transitory computer-readable storage medium, the memory can be configured to store non-transitory software programs and non-transitory computer-executable programs. In addition, the memory may include high-speed random-access memory and non-transitory memory, such as at least one disk memory device, flash memory device, or other non-transitory solid-state memory devices. In some embodiments, the memory may include memories remotely located with respect to the processor, and these remote memories may be connected to the processor through a network. Examples of the above networks include, but are not limited to, the Internet, intranet, local area network, mobile communication network, and combinations thereof.

It should be noted that the electronic device in this embodiment can be applied as a network controller, or a head node for sending service information in the embodiment shown in FIG. 1. The electronic device in this embodiment belongs to the same inventive concept as the network controller or the head node for sending service information in the embodiment shown in FIG. 1, so these embodiments have the same implementation principles and technical effects, and which will not be described in detail here.

Non-transitory software programs and instructions for the method for information processing are stored in a memory which, when executed by a processor, causes the processor to carry out the operations in any one of the methods for information processing in the embodiment as described above, e.g., S110 to S120 described in conjunction with FIG. 2, or S121 to S122 described in conjunction with FIG. 4.

In addition, an embodiment of the present disclosure further provides an electronic device, which includes a memory, a processor and a computer program stored in the memory and executable by the processor.

The processor and the memory may be connected by a bus or other means.

As a non-transitory computer-readable storage medium, the memory can be configured to store non-transitory software programs and non-transitory computer-executable programs. In addition, the memory may include high-speed random-access memory and non-transitory memory, such as at least one disk memory device, flash memory device, or other non-transitory solid-state memory devices. In some embodiments, the memory may include memories remotely located with respect to the processor, and these remote memories may be connected to the processor through a network. Examples of the above networks include, but are not limited to, the Internet, intranet, local area network, mobile communication network, and combinations thereof.

It should be noted that the electronic device in this embodiment can be applied as a network controller, or a head node for sending service information in the embodiment shown in FIG. 1. The electronic device in this embodiment belongs to the same inventive concept as the network controller or the head node for sending service information in the embodiment shown in FIG. 1, so these embodiments have the same implementation principles and technical effects, and which will not be described in detail here.

Non-transitory software programs and instructions for the method for generating a network model are stored in a memory which, when executed by a processor, causes the processor to carry out the operations in any one of the methods for generating a network model in the embodiments as described above, e.g., S210 to S220 described in conjunction with FIG. 6, or S221 to S222 described in conjunction with FIG. 7.

In addition, an embodiment of the present disclosure further provides an electronic device, which includes a memory, a processor and a computer program stored in the memory and executable by the processor.

The processor and the memory may be connected by a bus or other means.

As a non-transitory computer-readable storage medium, the memory can be configured to store non-transitory software programs and non-transitory computer-executable programs. In addition, the memory may include high-speed random-access memory and non-transitory memory, such as at least one disk memory device, flash memory device, or other non-transitory solid-state memory devices. In some embodiments, the memory may include memories remotely located with respect to the processor, and these remote memories may be connected to the processor through a network. Examples of the above networks include, but are not limited to, the Internet, intranet, local area network, mobile communication network, and combinations thereof.

It should be noted that the electronic device in this embodiment can be applied as a network controller, or a head node for sending service information in the embodiment shown in FIG. 1. The electronic device in this embodiment belongs to the same inventive concept as the network controller or the head node for sending service information in the embodiment shown in FIG. 1, so these embodiments have the same implementation principles and technical effects, and which will not be described in detail here.

Non-transitory software programs and instructions for the method for training a network model are stored in a memory which, when executed by a processor, causes the processor to carry out the operations in any one of the methods for training a network model in the embodiments as described above, e.g., S310 to S320 described in conjunction with FIG. 12, or S321 to S322 described in conjunction with FIG. 13.

The above-described embodiments are only schematic, in which the units illustrated as separate components may or may not be physically separated, that is, they device may be located in one place or distributed over several network units. Some or all of the modules can be selected according to the practical needs to achieve the purpose of this embodiment.

In addition, an embodiment of the present disclosure further provides a computer-readable storage medium, which stores computer-executable instructions which, when executed by a processor or controller, for example, by a processor in the embodiment of the electronic device, causes the processor to carry out the operations of the method for information processing, e.g., the above operations S110 to S120 described in conjunction with FIG. 2, or S121 to S122 described in conjunction with FIG. 4. Alternatively, the computer-executable instructions, when are executed by a processor in the embodiment of the electronic device, causes the processor to carry out the operations of the method for generating a network model, e.g., S210 to S220 described in conjunction with FIG. 6, or S221 to S222 described in conjunction with FIG. 7. Alternatively, the computer-executable instructions, when are executed by a processor in the embodiment of the electronic device, causes the processor to carry out the operations of the method for training a network module, e.g., S310 to S320 described in conjunction with FIG. 12, or S321 to S322 described in conjunction with FIG. 13.

An embodiment of the present disclosure includes, acquiring a transmission parameter of service information in the network, where the transmission parameter is indicative of a transmission performance of the service information in the network; and predicting a transmission performance of the transmission parameter by means of a pre-trained network model, where the network model comprises a GCN model that is acquired according to the transmission path information of the service information in the network. According to the scheme set forth in various embodiments of the present disclosure, since the GCN model is obtained according to the transmission path information of service information in the network, the GCN model is consistent with the network topology for transmitting service information. Therefore, the transmission performance of service information in the network can be predicted accurately and effectively by means of processing of the transmission parameters of service information in the network with the network model including the GCN model.

It shall be appreciated by a person having ordinary skills in the art that all or some of the steps and systems disclosed above can be implemented as software, firmware, hardware and their appropriate combinations. Some or all physical components can be implemented as software executed by a processor, such as a central processing unit, a digital signal processor or a microprocessor, or as hardware, or as an integrated circuit, such as an application specific integrated circuit. Such software can be distributed on computer-readable media, which can include computer storage media (or non-transitory media) and communication media (or transitory media). As is well known to a person having ordinary skills in the art, the term computer storage medium includes volatile and nonvolatile, removable and non-removable medium implemented in any method or technology for storing information such as computer readable instructions, data structures, program modules or other data. Computer storage medium include, but are not limited to, RAM, ROM, EEPROM, flash memory or other memory technologies, CD-ROM, digital versatile disks (DVD) or other optical disk storage, magnetic boxes, tapes, magnetic disk storage or other magnetic storage devices, or any other medium that can be used to store desired information and accessible by a computer. Furthermore, it is well known to those having ordinary skills in the art that communication media usually contains computer-readable instructions, data structures, program modules or other data in modulated data signals such as carrier waves or other transmission mechanisms, and can include any information delivery media.

Described above is a description for some embodiments of the present disclosure, but the present disclosure is not limited to the above embodiments. Those having ordinary skills in the art can make various equivalent modifications or substitutions without departing the scope of the present disclosure, and these equivalent modifications or substitutions are within the scope defined by the claims of the present disclosure.

The invention claimed is:

1. A method for information processing, comprising,
acquiring a transmission parameter of service information in a network,
wherein the transmission parameter is indicative of transmission performance of the service information in the network; and
generating a Graph Convolutional Network (GCN) model according to transmission path information of the service information in the network, the transmission path information comprises head node information and end node information, and generating the GCN model according to the transmission path information of the service information in the network comprises,
creating a plurality of input nodes according to the head node information and the end node information;
connecting at least two input nodes among the plurality of input nodes having a same-source relationship or a same-destination relationship, to acquire the GCN model; and
predicting transmission performance of the transmission parameter by means of a pre-trained network model,
wherein the network model comprises the GCN model, so as to be consistent with a network topology for transmitting service information;
the GCN model comprises the plurality of input nodes configured to input at least one transmission parameter, the plurality of input nodes corresponds to the transmission path information; and each of the plurality of input nodes corresponds to a respective one of a plurality of service transmission paths in the network topology comprising a plurality of network nodes with a service transmission path formed between adjacent ones of the plurality of network nodes; and
at least two input nodes of the plurality of input nodes having a same-source relationship or a same-destination relationship are connected; wherein the same-source relationship indicates at least two of the plurality of service transmission paths have a same source node, the same-destination relationship at least two of the plurality of service transmission paths have a same destination node.

2. The method according to claim 1, wherein the network model further comprises a deep neural network (DNN) model, and predicting the transmission performance of the transmission parameter by means of the pre-trained network model comprises,
  processing the transmission parameter by means of the GCN model to acquire a transmission feature parameter; and
  processing the transmission parameter by means of the DNN model to acquire a result of transmission performance prediction.

3. The method according to claim 2, wherein processing the transmission parameter by means of the GCN model to acquire the transmission feature parameter comprises,
  processing the transmission parameter to acquire the transmission feature parameter by an equation $y=\Theta *gx=\sigma(\alpha(L)x)$;
  wherein, y is the transmission feature parameter;
  x is the transmission parameter;
  $\Theta$ is a convolution kernel function;
  $*g$ is a graph convolution operator with a spectral method, which represents a product of x and $\Theta$;
  $\alpha$ is a convolution kernel parameter;
  L is a normalized graph Laplacian operator; and
  $\sigma$ is an activation function.

4. The method according to claim 2, wherein after acquiring the result of transmission performance prediction, the method further comprises,
  optimizing transmission performance of the service information by means of the result of the transmission performance prediction.

5. The method according to claim 1, wherein the transmission parameter comprises at least one of,
  service flow,
  optical signal-to-noise ratio (OSNR),
  bit error rate, or
  output optical power.

6. A method for generating a network model, comprising,
  acquiring transmission path information of service information in a network; and
  generating a Graph Convolutional Network (GCN) model according to the transmission path information,
    wherein the GCN model comprises a plurality of input nodes configured to input a transmission parameter of the service information, and
    the input nodes correspond to the transmission path information, and
    the transmission parameter is indicative of transmission performance of the service information in the network;
    the transmission path information comprises head node information and end node information; and
    generating the GCN model according to the transmission path information comprises,
    creating a plurality of input nodes according to the head node information and the end node information;
    connecting at least two input nodes among the plurality of input nodes having a same-source relationship or a same-destination relationship, to acquire the GCN model, so as to be consistent with a network topology for transmitting service information;
    the GCN model comprises a plurality of input nodes configured to input at least one transmission parameter, the plurality of input nodes corresponds to the transmission path information; and each of the plurality of input nodes corresponds to a respective one of a plurality of service transmission paths in the network topology comprising a plurality of network nodes with a service transmission path formed between adjacent ones of the plurality of network nodes; and
    input nodes of the plurality of input nodes having a same-source relationship or a same-destination relationship are connected; wherein the same-source relationship indicates at least two of the plurality of service transmission paths have a same source node, the same-destination relationship at least two of the plurality of service transmission paths have a same destination node.

7. The method according to claim 6, wherein the GCN model is expressed by an equation $y=\Theta *gx=\sigma(\alpha(L)x)$;
  wherein, y is an output parameter of the GCN model;
  x is an input parameter input to the GCN model;
  $\Theta$ is a convolution kernel function;
  $*g$ is a graph convolution operator with a spectral method, which represents a product of x and $\Theta$;
  $\alpha$ is a convolution kernel parameter;
  L is a normalized graph Laplacian operator; and
  $\sigma$ is an activation function.

8. The method according to claim 6, wherein the transmission parameter comprises at least one of,
  service flow,
  optical signal-to-noise ratio (OSNR),
  bit error rate,
  or output optical power.

9. A method for training a network model, comprising,
  acquiring a transmission parameter of service information in a network,
    wherein the transmission parameter is indicative of transmission performance of the service information in the network;
  generating a Graph Convolutional Network (GCN) model according to transmission path information of the service information in the network, the transmission path information comprises head node information and end node information, and generating the GCN model according to the transmission path information of the service information in the network comprises,
    creating a plurality of input nodes according to the head node information and the end node information;
    connecting at least two input nodes among the plurality of input nodes having a same-source relationship or a same-destination relationship, to acquire the GCN model; and
  training the network model by means of the transmission parameter,
    wherein the network model comprises the GCN model, so as to be consistent with a network topology for transmitting service information;
    the GCN model comprises the plurality of input nodes configured to input at least one transmission parameter, the plurality of input nodes correspond to the transmission path information; and each of the plurality of input nodes corresponds to a respective one of a plurality of service transmission paths in the network topology comprising a plurality of network nodes with a service transmission path formed between adjacent ones of the plurality of network nodes; and
    at least two input nodes of the plurality of input nodes having a same-source relationship or a same-destination relationship are connected; wherein the same-source relationship indicates at least two of the plurality of service transmission paths have a same source node, the same-destination relationship at least two of the plurality of service transmission paths have a same destination node.

10. The method according to claim 9, wherein the network model further comprises a deep neural network (DNN) model, and training the network model by means of the transmission parameter comprises, inputting the transmission parameter to each input node to train the GCN model to acquire a transmission feature sample; and inputting the transmission feature sample into the DNN model to train the DNN model.

11. The method according to claim 10, wherein inputting the transmission parameter to each input node to train the GCN model comprises, inputting the transmission parameter to each input node, and training the GCN model by a back propagation algorithm.

12. The method according to claim 10, wherein inputting the transmission feature sample into the DNN model to train the DNN model comprises, inputting the transmission feature sample into the DNN model, and training the DNN model by a back propagation algorithm.

13. The method according to claim 9, wherein the GCN model is expressed by an equation $y=\Theta*gx=\sigma(\alpha(L)x)$;

wherein, y is an output parameter of the GCN model;

x is an input parameter input to the GCN model;

$\Theta$ is a convolution kernel function;

*g is a graph convolution operator with a spectral method, which represents a product of x and $\Theta$;

σ is a convolution kernel parameter;

L is a normalized graph Laplacian operator; and

σ is an activation function.

14. An electronic device, comprising a memory, a processor and a computer program stored in the memory and executable by the processor which, when executed by the processor causes the processor to carry out the method of claim 1.

15. An electronic device, comprising a memory, a processor and a computer program stored in the memory and executable by the processor which, when executed by the processor causes the processor to carry out the method of claim 6.

16. An electronic device, comprising a memory, a processor and a computer program stored in the memory and executable by the processor which, when executed by the processor causes the processor to carry out the method of claim 9.

17. A non-transitory computer-readable storage medium storing a computer-executable instruction which, when executed by a processor causes the processor to carry out the method of claim 1.

* * * * *